US008261275B2

(12) United States Patent
Johnson et al.

(10) Patent No.: US 8,261,275 B2
(45) Date of Patent: Sep. 4, 2012

(54) METHOD AND SYSTEM FOR HEURISTICS-BASED TASK SCHEDULING

(75) Inventors: Darrin P. Johnson, San Jose, CA (US); Eric C. Saxe, Livermore, CA (US)

(73) Assignee: Oracle America, Inc., Redwood City, CA (US)

( * ) Notice: Subject to any disclaimer, the term of this patent is extended or adjusted under 35 U.S.C. 154(b) by 700 days.

(21) Appl. No.: 12/494,034

(22) Filed: Jun. 29, 2009

(65) Prior Publication Data

US 2010/0333113 A1 Dec. 30, 2010

(51) Int. Cl.
 *G06F 9/46* (2006.01)
(52) U.S. Cl. ......................................... 718/102; 719/318
(58) Field of Classification Search .................. None
 See application file for complete search history.

(56) References Cited

U.S. PATENT DOCUMENTS

| | | | | |
|---|---|---|---|---|
| 6,868,413 | B1 * | 3/2005 | Grindrod et al. | 706/59 |
| 7,401,112 | B1 * | 7/2008 | Matz et al. | 709/202 |
| 7,454,752 | B2 * | 11/2008 | Masuoka | 718/102 |
| 8,056,079 | B1 * | 11/2011 | Martin et al. | 718/102 |
| 2002/0116248 | A1 * | 8/2002 | Amit et al. | 705/9 |
| 2005/0097103 | A1 * | 5/2005 | Zane et al. | 707/6 |
| 2007/0180089 | A1 * | 8/2007 | Fok et al. | 709/223 |
| 2009/0276779 | A1 * | 11/2009 | Kato et al. | 718/102 |
| 2009/0276781 | A1 * | 11/2009 | Chan et al. | 718/103 |

OTHER PUBLICATIONS

Apple Inc., "Technology Brief Grand Central Dispatch A better way to do multicore", Jun. 2009 ; 6 pages.

* cited by examiner

*Primary Examiner* — Emerson Puente
*Assistant Examiner* — Hiren Patel
(74) *Attorney, Agent, or Firm* — Osha Liang LLP (57) ABSTRACT

A computer readable storage medium including executable instructions for heuristics-based task scheduling. Instructions include receiving a first event notification associated with a first event, where the first event is determined from the first event notification. Instructions further include determining whether a predicate for an action is satisfied by the first event, where the action predicate, the action, and an action parameter are associated with a task object in a task pool. Instructions further include obtaining the action parameter when the action predicate is satisfied by the first event, where a priority is assigned using a heuristics policy to the task object based on the action parameter. Instructions further include inserting the task object into a task queue using the assigned priority. The action associated with the task object is performed by an execution thread. The performance of the action is a second event associated with a second event notification.

16 Claims, 6 Drawing Sheets

METHOD AND SYSTEM FOR HEURISTICS-BASED TASK SCHEDULING

BACKGROUND

A modern computer system may be conceptually divided into hardware, operating system, and application programs. The hardware, (i.e., central processing unit (CPU), memory, persistent storage devices, and input/output (I/O) devices) provides the basic computing resources. The application programs (i.e., compilers, database systems, software, and business programs) define the ways in which these resources are used to solve the computing problems of the users. The users may include people, machines, and other computers that use the application programs, which in turn employ the hardware to solve numerous types of problems.

An operating system is a program that acts as an intermediary between the application program layer and the computer hardware. To this end, the operating system is involved in coordinating the efficient and fair use of a finite resource base to enable a broad range of computative tasks (i.e., memory management, hardware resource management, maintaining a file system, processing user-level requests, administrative tasks, networking tasks, etc.). In some instances, when the operating system dispatches an execution thread to perform a particular computative task, the execution thread may execute until the task has completed. Alternatively, in other instances, the operating system may employ a polling scheme which allows for the computative task to periodically "awaken", execute, and then "sleep" based upon use a pre-determined time interval.

SUMMARY

In general, in one aspect, the invention relates to a computer readable storage medium including executable instructions for heuristics-based task scheduling, where executable instructions include instructions to receive a first event notification at a task engine, wherein the first event notification is associated with a first event. Executable instructions further include instructions to determine a first event using the first event notification. Executable instructions further include instructions to determine whether a predicate for an action is satisfied by the first event, where the predicate for the action, the action, an action parameter for the action are associated with a task object in a task pool. Executable instructions further include instructions to obtain the action parameter using the task object when the predicate for the action is satisfied by the first event. Executable instructions further include instructions to assign the task object a priority using a heuristics policy based on the action parameter. Executable instructions further include instructions to insert the task object into a task queue using the assigned priority, where the task queue comprises a plurality of task objects ordered according to priority. The action associated with the task object is performed by an execution thread when the task object is obtained from the task queue. The performance of the action is a second event associated with a second event notification sent to the task engine.

In general, in one aspect, the invention relates to a system for heuristics-based task scheduling. The system includes a processor and an operating system executing on the processor. The operating system includes a task engine. The task engine is configured to receive a request. The task engine is further configured to determine a task corresponding with the request using a request-to-task mapping. The task engine is further configured to obtain a task entry corresponding with the task from a task store, where the task entry associates the task with an action, a predicate for performing the action, and an action parameter for the action. The task engine is further configured to create a task object in a task pool using the task entry, where the task object is associated with the action, the predicate, and the action parameter. The task engine is further configured to receive a first event notification, where the first event notification is associated with a first event. The task engine is further configured to determine the first event using the first event notification. The task engine is further configured to determine whether the predicate for performing the action is satisfied by the first event. The task engine is further configured to send the task object to a task scheduler when the predicate for performing the action is satisfied by the first event. The operating system further includes a task store configured to store a task entry. The operating system further includes a task pool configured to store a task object when a predicate for an action associated with the task object has not yet been satisfied. The operating system further includes a heuristics policy store configured to store a heuristics policy for assigning a priority to a task object. The operating system further includes a task scheduler configured to obtain an action parameter using a task object when a predicate for an action associated with the task object is satisfied by an event. The task scheduler is further configured to assign the task object a priority using the heuristics policy based on the action parameter. The task scheduler is further configured to insert the task object into a task queue using the priority, where the task queue includes a plurality of task objects ordered according to priority. The operating system further includes a task queue configured to store a task object when a predicate for an action associated with the task object has been satisfied and the task object has been assigned a priority by the task scheduler. The operating system further includes a dispatcher configured to obtain a task object from a task queue, determine an action using the task object, determine an execution thread for performing the action, and dispatching the executing thread for performing the action. The operating system is further configured to create a second event notification for sending to the task engine when the execution thread has completed performing the action, where the completion of the action is a second event associated with the second event notification.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for heuristics-based task scheduling in an event-driven system. More specifically, embodiments of the invention are directed to scheduling a task using a user-provided (or pre-defined) description for the task and a heuristics policy. Accordingly, a task is scheduled using descriptions accounting for a desired quality of service (QoS) associated with the task. In one or more embodiments of the invention, a task is a unit of computation performed by an executing thread. Further, a description for a task may provide a discrete action to be performed when the task is executed. In addition, a description for a task may specify a predicate for performing the action. As such, satisfaction of the predicate may serve as a precondition for performance of the action or, said another way, performance of the action depends upon satisfaction of the predicate. In one or more embodiments of the invention, a predicate is an event which may occur. Examples of an event may include, but are not limited to, an action by a user, the completion of a task, the reaching of an operation threshold (e.g., the temperature of processor, the amount of time within a given time interval that a processor is active, the amount of space remaining on a computer readable storage medium, etc.), or any other discrete event that can be described either quantitatively or qualitatively by a user in relation to a system.

In one embodiment of the invention, the QoS for a task specifies a level of performance for the action in the task, where the level of performance may include a guaranteed minimum number of computing resources to perform the task, a guaranteed minimum amount of network bandwidth allocated to perform the action, a minimum guaranteed amount of memory to perform the action, etc. Further, the quality of service may indicate a deadline for completing an action specified in the task (e.g., within 5 ms of another task, within a certain time period once the task object is created, etc.) and whether the action in the task is deferrable (e.g., whether execution of the task object may deferred if another higher priority task object is placed on the task queue and how long the task object may be deferred). Those skilled in the art will appreciate that the quality of service defined for a given task is not limited to the above examples.

Figure 1:
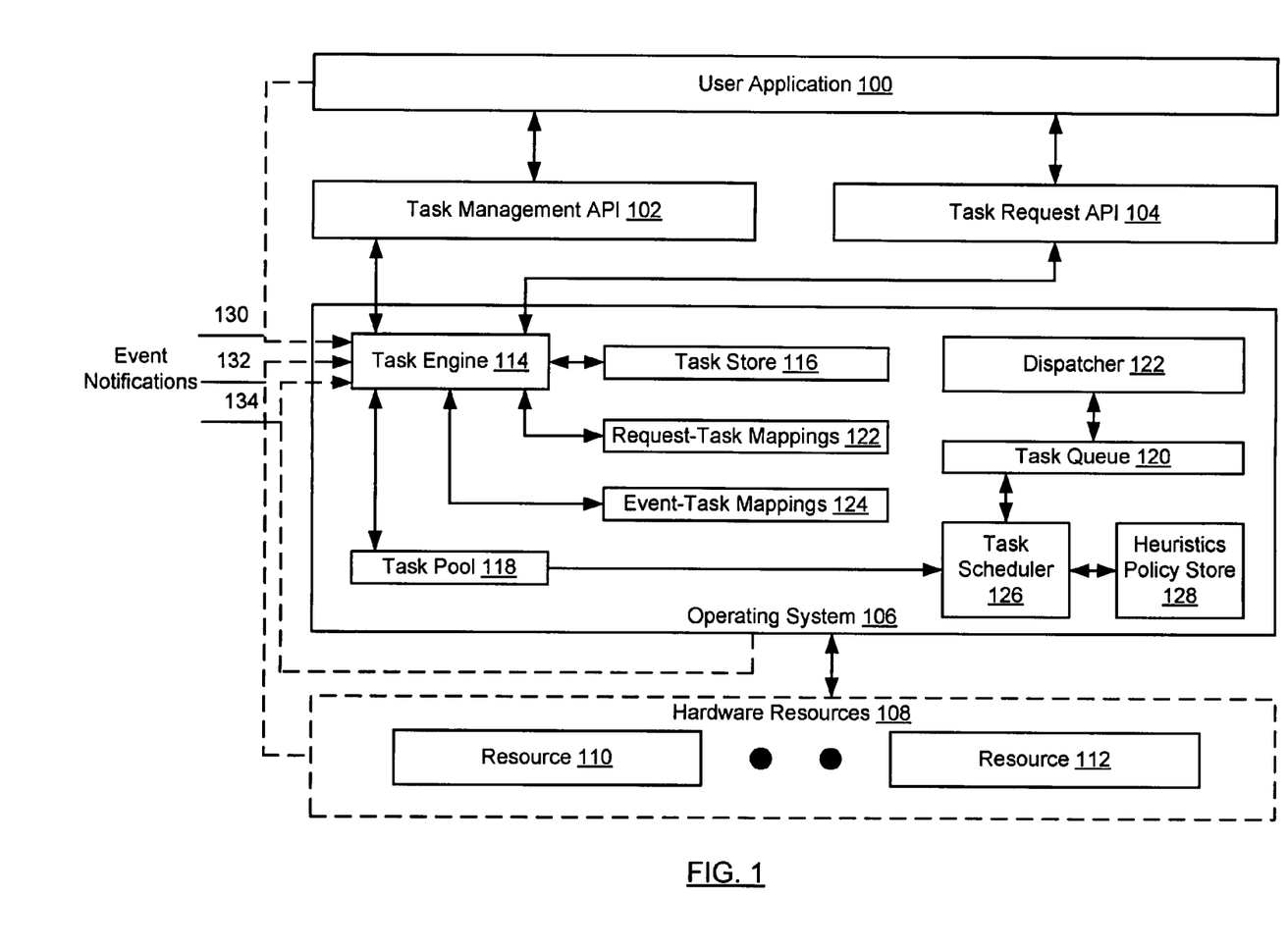
FIG. 1 shows a system in accordance with one or more embodiments of the invention.

FIG. 1 shows a system in accordance with one or more embodiments of the invention. Specifically, FIG. 1 shows (i) a user application (100), (ii) an operating system (106), (iii) application programming interfaces (102, 104) that enable a user application (100) to interact with the OS (106), and (iv) hardware resources (108).

User Application

In one or more embodiments of the invention, a user application (100) exists in the software layer of the system with which a user interacts. The user application (100) may be, for example, any application that provides a benefit or attempts to solve a problem and, in doing so, makes use of the system. Examples of user applications may include, for example, a compiler, a database system, a web browser, a web server, a spreadsheet program, a multimedia program, a business program, or any other software. In one or more embodiments of the invention, the user application (100) uses one or more application programming interfaces (i.e., APIs: 102, 104) to issue requests to and receive responses from the OS (106).

Operating System (OS)

In one or more embodiments of the invention, an operating system (106) is configured to receive requests and event notifications (130, 132, 134). A request may be issued to the OS (106) by a user application (100) using an API (102, 104). Alternatively, a request may be issued by the OS (106) itself. An event notification (130, 132, 134) is associated with an event that has occurred in relation to the system. An event notification may signal an action by a user, the completion of a task, the reaching of an operation threshold, a specified time period elapsing, or any other discrete event that may be described either quantitatively or qualitatively. Upon receipt by the OS (106), a request or event notification is processed using various OS components and defined data structures as shown in FIG. 1: a task engine (114), a task store (116), request-to-task mappings (122), event-to-task mappings (124), a task pool (118), a task queue (120), a task scheduler (126), a heuristics policy store (128), and a dispatcher (122).

In one or more embodiments of the invention, a task engine (114) is configured to receive and subsequently process a request or event notification. Further, after having processed a request, the task engine (114) is configured to send a response to the request in accordance with one or more embodiments of the invention. More detail as to the processing of a received request or a received event notification is provided in relation to FIGS. 3 and 4, respectively.

In one or more embodiments of the invention, a task store (116) is configured to store a task entry. A task entry specifies an action to be performed and a predicate for performing the action. An example of a task entry defined in accordance with one or more embodiments of the invention is provided in FIG. 2a. In one or more embodiments of the invention, a task entry may be stored in, modified in, or deleted from the task store (116) in accordance with a request issued to the task store by the task engine (114).

In one or more embodiments of the invention, a request-to-task mapping (122) is maintained by the OS (106). Specifically, the request-to-task mapping (122) associates one or more tasks with a request. In one or more embodiments of the invention, the request-to-task mapping (122) is created, maintained, and deleted in accordance with a request received by the task engine (114). For example, a user may issue a request to establish a network connection. As such, tasks related to this request may include: (a) enumeration of one or more network interfacing devices in the system; (b) initializing and associating each network interface device with an appropriate device driver; (c) request by a network configuration utility to configure the network interface parameters (i.e., IP address, subnet mask, default route, wireless network name, etc.); (d) detection by the driver of the network media (i.e., cable, available wireless network, etc.); (e) configuration of the device by the driver of the network interface parameters; (f) request by an application for a communication socket; (g) request by an application to configure the socket for communication with a given remote system; and (h) request by an application to read or write data to or from the remote system using the communication socket.

Further, in one or more embodiments of the invention, the one or more tasks mapped to by a request may have interrelated dependencies. In furtherance of the example provided above, for example, task (h) may depend from task (g), task (g) may depend from task (f), task (f) may depend from task (e), and task (e) may depend from both tasks (b) and (c). In addition, tasks (d) and (c) may both depend from task (b) where task (b) may itself depend from task (a). In addition, in one or more embodiments of the invention, tasks may themselves be broken into further subtasks.

In one embodiment of the invention, the task engine (114) includes functionality to decompose a request at runtime into a series of tasks. The request may be decomposed by determine which of the task (as defined by task entries in the task store) may be used to satisfy the request. Further, the task engine may use both the request-to-task mapping and the functionality to decompose a request at runtime into a series of tasks of the task engine to determine which tasks are required to satisfy the request. Further, in one embodiment of the invention, the task engine may first determine whether there is a request-to-task mapping for the request. If not, the task engine may use functionality to decompose a request at runtime into a series of tasks.

In one or more embodiments of the invention, an event-to-task mapping (124) is maintained by the OS (106). Specifically, the event-to-task mapping (124) associates a task with an event (or type of event). In one or more embodiments of the invention, the event-to-task mapping (124) is created, maintained, and deleted in accordance with a request received by the task engine (114). For example, an event notification may signal that a core of a multi-core processor has reached a specified temperature threshold. As such, tasks related to this event may include: (a) creating a fault management data record to note the temperature violation of the core; (b) consumption of the created fault management data record by a diagnosis and treatment engine and subsequent determination as to whether corrective action is needed; (c) logging of diagnostic information about the temperature violation; and (d) configuring of the core to operate in a thermal throttling mode such that operating temperature is brought into compliance. Similarly, these tasks may be interrelated. For example, (d) may depend from (b) and (b) may depend from (a). Further, (c) may also depend from (a).

In one or more embodiments of the invention, a task pool (118) is configured to store a task object. The task object specifies an action, a predicate for performing the action, and an transaction identifier. In one or more embodiments of the invention, the task object is created and stored in the task pool (118) by the task engine (114) using the corresponding task entry.

In one or more embodiments of the invention, a task queue (120) is configured to store a task object (as described above). In one or more embodiments of the invention, the task object is removed from the task pool (118), where it is created, and placed in the task queue (120) when the predicate for performing the action associated with the task is satisfied and the task object has been assigned a priority by a task scheduler. In one or more embodiments of the invention, there may be a set of virtualized task queues that can be used to filter task objects according to a task characteristic or any other criteria. For example, task objects in a task queue may be filtered into virtual queues according to transaction identifier. In one embodiment of the invention, the system may include multiple task queues, where each task queue may be associated with request, task objects having an particular priority level, or any other type of classification/group which may be applied to task objects. Further, in one embodiment of the invention, if there are multiple task queues, each task queue (or sub-sets of the task queues) may be associated with a separate processor or processor group.

In one or more embodiments of the invention, a task scheduler (126) is configured to receive a task object. In one or more embodiments of the invention, the task object is received from a task pool (118) when the predicate for the action associated with the task object has been satisfied. Subsequently, the task scheduler (126) uses a heuristics policy to determine how to schedule the task object relative to other task objects in the task queue. In one of the invention, the heuristics policy may determine how to schedule the task object based on an action parameter (described below with respect FIG. 2a) associated with the task object. Embodiments of heuristics policies are provided below.

In one or more embodiments of the invention, the dispatcher (122) is configured to obtain a task object. In one or more embodiments of the invention, the dispatcher (122) obtains the task object when a predicate for an action associated with the task object has been satisfied and a task scheduler (126) has assigned a priority for the task object. In addition, the dispatcher is also configured in accordance with one or more embodiments of the invention to assign an execution thread to perform the action associated with the task object. In one embodiment of the invention, the task queue is implemented as a first-in-first-out (FIFO) queue. In one embodiment of the invention, the task objects in the task queue are ordered based on priority. Further, as new task objects are added to the task queue, the ordering of the existing task objects in the queue may be modified such that once the new task object is added to the task queue, all task objects in the task queue (including the newly added task object) are ordered based on priority. Alternatively, in one or more other embodiments of the invention, a task queue may be implemented using some other ordering scheme.

In one or more embodiments of the invention, a heuristics policy store (128) is configured to store a plurality of heuristics policies. Specifically, a heuristics policy may be user-defined or per-defined by a third-party. Further, a user (or another third-party) may express a selection for a heuristics policy from the heuristics policy store (128) using an application programming interface (API).

Heuristics policies may allow for any number of scheduling criteria. For example, a dependent event clustering policy may consider task interdependencies in determining a task schedule. As such, a set of tasks that are dependent upon each other may all be scheduled to serially utilize the same resource. Alternatively, a set of tasks that are independent of each other may instead be scheduled for parallel utilization on different resources.

In another example of a heuristics policy, the frequency for performing computative actions may vary as a function of system utilization and performance. For example, a task may be scheduled to poll a device or perform periodically at a given rate if a particular condition is met (e.g., the processor is busy, mouse has moved, a universal serial bus (USB) port has detected the presence of an attached USB device, the system load is above a certain threshold, etc.). Alternatively, if that particular condition is not met, then the frequency for computative action may be either elevated or depressed accordingly to some action parameter. Further, the performance of computative actions in some cases may be filtered out (i.e., not allowed to execute/perform/utilize) based upon whether a heuristics policy deems a predicate to be transient (i.e., for example, a spike in activity or inactivity that is historically not predicated to persist). Further, the predicate for the task object may be adjusted accordingly if the satisfaction of the predicate for the action is merely transient.

In another example of a heuristics policy, actions are given priorities explicitly by a user. As such, an action with a high priority takes precedence over an action that has a lower relative priority. Further, actions with a low relative priority are considered more easily deferrable, for example, during periods of sustained high priority activity. Further, a heuristics policy may define an aging policy for actions with respect to their priority. For example, a priority for an action may increase or decrease with respect to time or some other system-quantifiably measure.

In another example of a heuristics policy, actions are deferred until system resources are available. Specifically, this may be a directive purposed to minimize power state transitions and therefore lessen overhead costs associated with system management.

In another example of a heuristics policy, the task objects for execution on a particular resource may be deferred until a certain number of task objects are accumulated. At that time, the task objects are dispatched to the resource of execution. Such a heuristics policy may be used in scenarios in which a decrease in performance may be allowed in order to decrease power consumption of the resource.

The afore-mentioned heuristics policy serve merely as examples of system management directives that may be used in the strategic scheduling of computative tasks. Those skilled in the art will recognize that these are just a few of the heuristics policies that may be implemented to that end and therefore should not be construed as limiting the scope of the invention.

Application Programming Interfaces (API)

In one or more embodiments of the invention, an application programming interface (102, 104) is used to facilitate the sending of requests from the user application (100) to the OS (106). Further, in one or more embodiments of the invention, the OS (106) may provide an API-compliant response to the user application (100).

In one or more embodiments of the invention, a first API (102) is configured to manage (i.e., create, modify, delete, etc.) a task entry maintained by the OS. As such, the first API (102) may be thought of as a Task Management API. For example, requests issued through the Task Management API (102) may manage a task entry in the task store (116), a request-to-task mapping (122), or an event-to-task mapping (124). Further, a request may be issued through the Task Management API (102) for purposes of managing (creating, modifying, deleting, selecting, etc.) a heuristics policy.

In one or more embodiments of the invention, a second API (104) is configured to allow a user of a user-level application (100) to issue requests to the OS (106) resulting in the creation of one or more pending task objects. As such, the second API (104) may be thought of as a Task Request API. For example, requests issued through the Task Request API (104) may be translated into one or more discrete task objects defined by a request-to-task mapping (122).

Hardware Resources

In one or more embodiments of the invention, a hardware resource (110, 112) is utilized according to a request issued by an OS (106). Specifically, a request issued by the OS (106) may require the utilization of the hardware resource (110, 112) pursuant to an action executed by a dispatched execution thread. The hardware resource (110, 112) may be, for example, a memory device (e.g., non-volatile memory, volatile memory, etc.), a processor (e.g., single core, multi-core), an I/O device (e.g., a network interface card), a cooling device (e.g., a cooling fan, etc.) or any other hardware device capable of receiving a request from the OS (106).

Figure 2A:
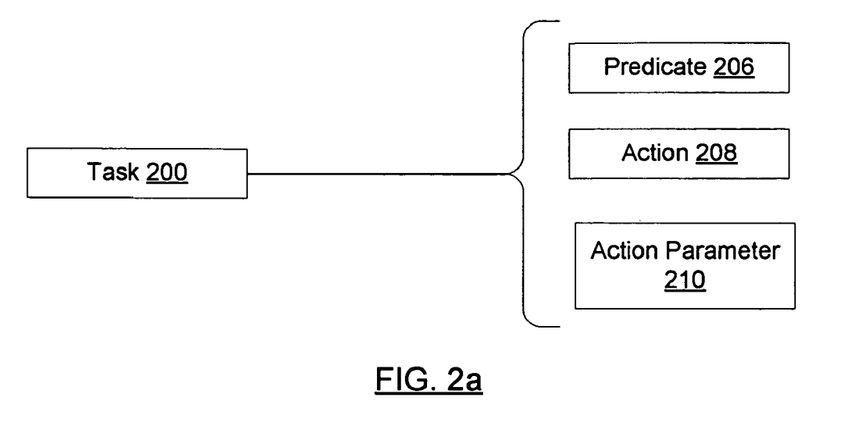
FIGS. 2a and 2b show data structures in accordance with one or more embodiments of the invention.
Figure 2B:
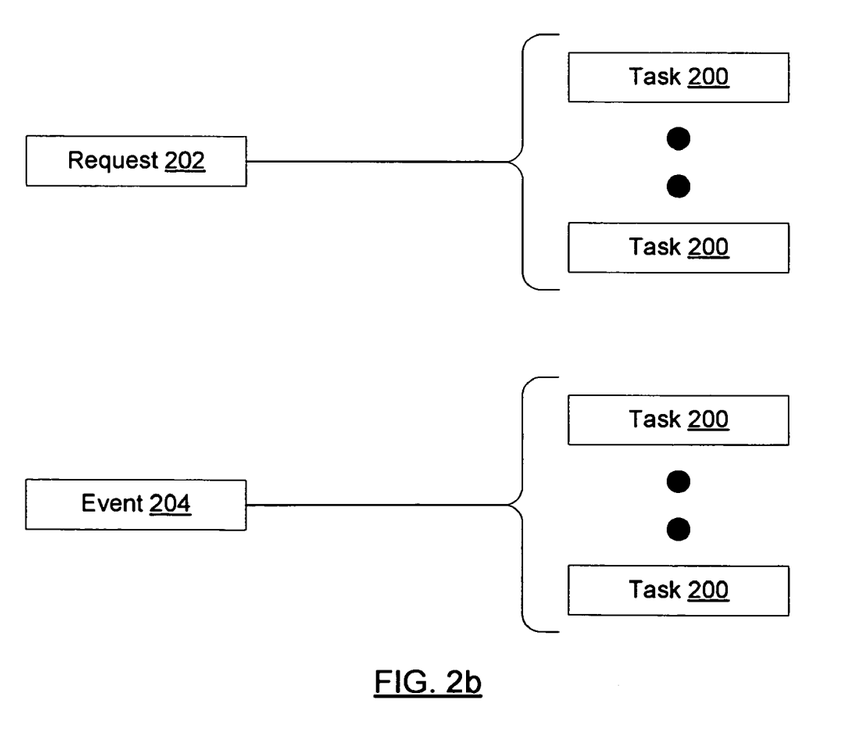

FIGS. 2a and 2b show data structures in accordance with one or more embodiments of the invention.

FIG. 2a shows a data structure used in accordance with one or more embodiments of the invention to define a task object. Specifically, the data structure shown in FIG. 2a may be used to associate an action (208), a predicate (206) for an action, and, optionally, an action parameter (210) with a task (200). The action (208) associated with the task (200) is performed only when the predicate (206) for the action is satisfied. Further, the action is performed in accordance with the action parameter (210). In one or more embodiments of the invention, the action parameter specifies the manner in which action is to be performed. As such, the action parameter may include explicit information about the manner in which the action is performed. For example, the action parameter may include, but is not limited, a time interval that defines an action frequency. Alternatively (or in addition to the afore-mentioned explicit information), the action parameter may include a priority for performing the action or specify the minimum and/or maximum QoS for the task. Those skilled in the art will recognize that a variety of other descriptions may be provided by way of an action parameter to further define the performance of the action. In one or more embodiments of the invention, the data structure shown in FIG. 2a may be used to define a task entry stored in the task store (as described in relation to FIG. 1).

FIG. 2b shows data structures used in accordance with one or more embodiments of the invention to define task mappings. Specifically, the first data structure shown in FIG. 2b may be used to associate a request (202) with one or more tasks (200). Further, the second data structure shown in FIG. 2b may be used to associate an event (204) with one or more tasks (200). In one or more embodiments of the invention, the first data structure may be used to define the request-to-task mapping and the second data structure may be used to define the event-to-task mapping as described in relation to FIG. 1.

Figure 3:
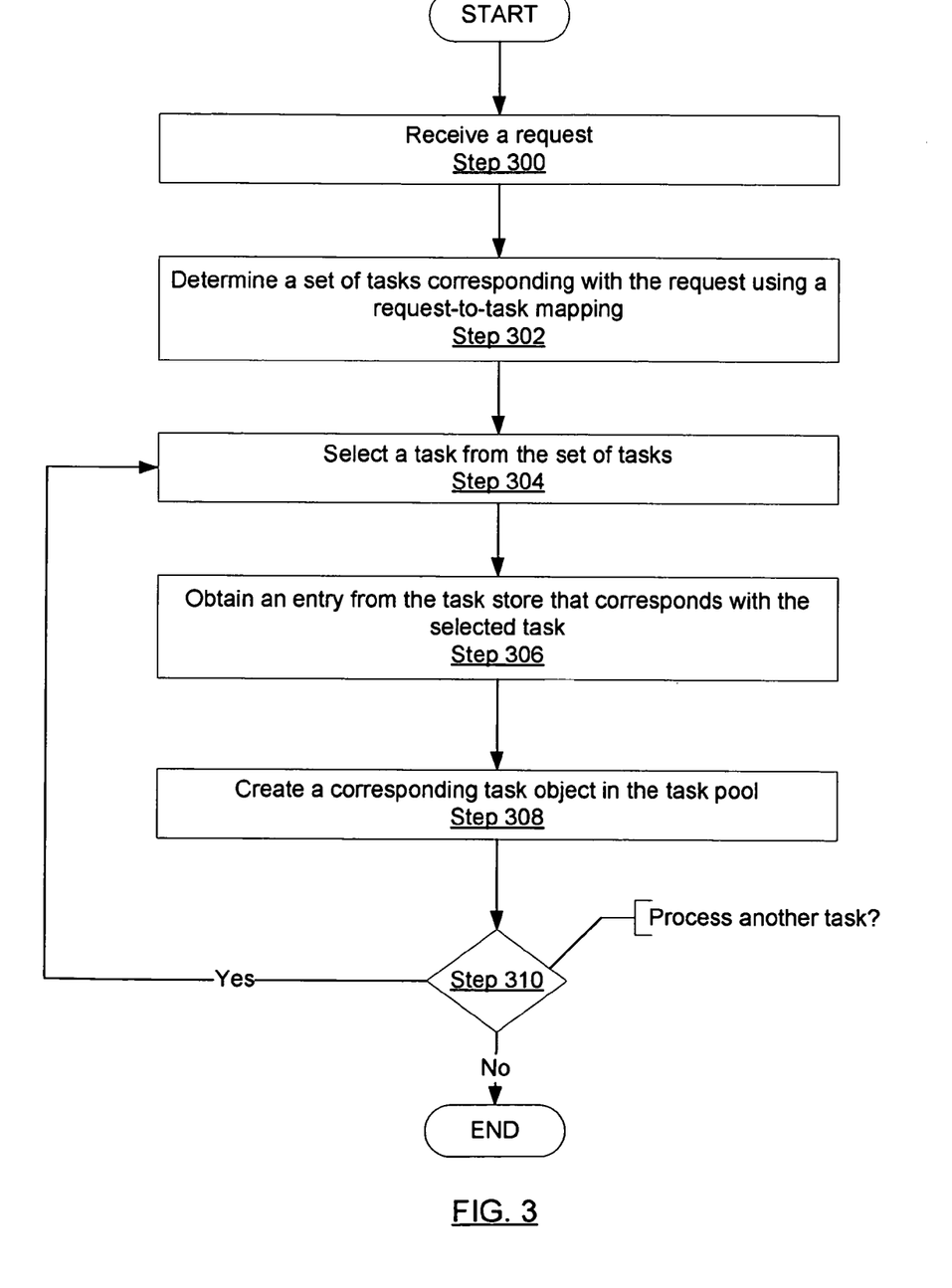
FIGS. 3, 4, and 5 show flowcharts in accordance with one or more embodiments of the invention.
Figure 4:
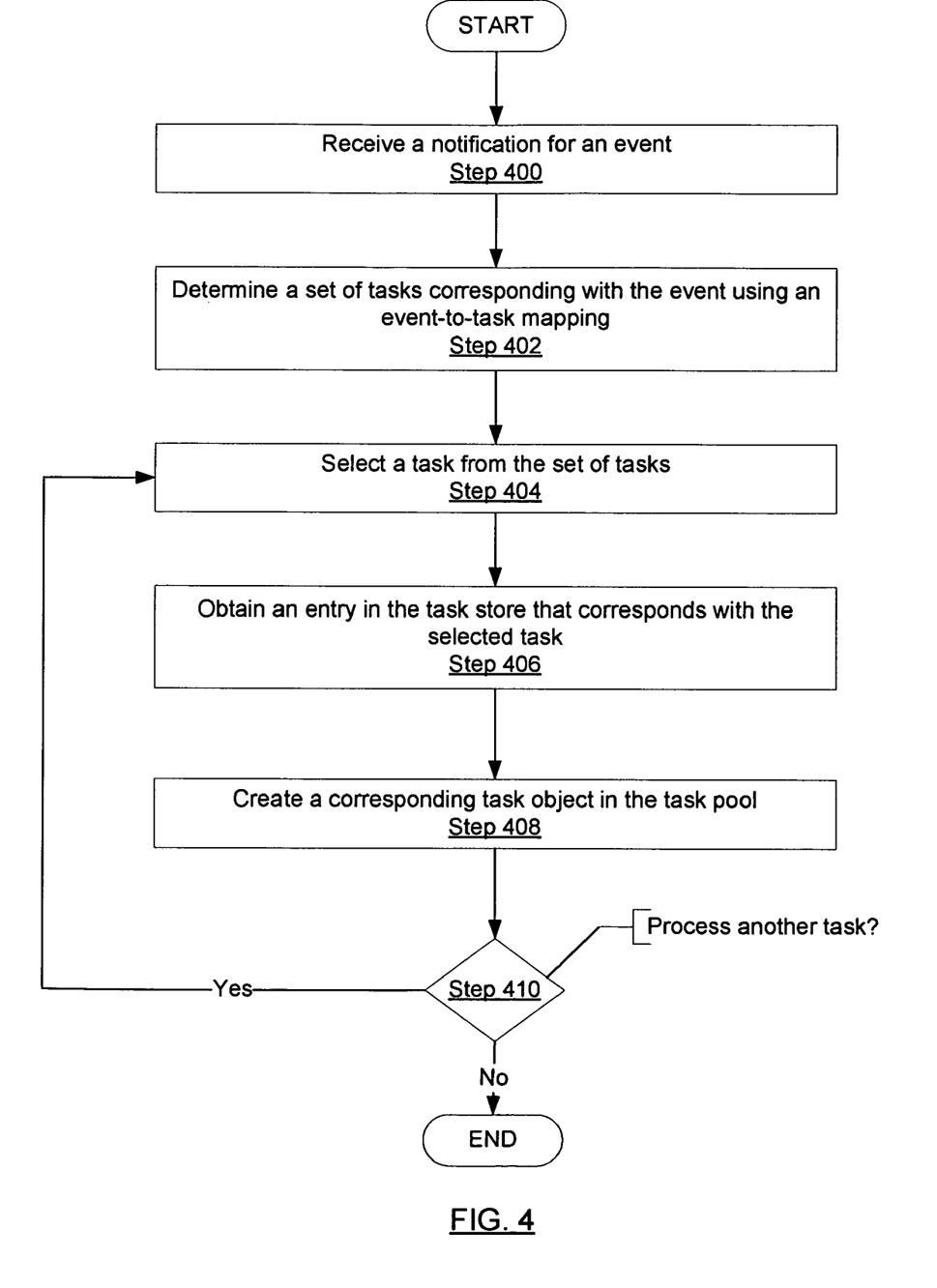
Figure 5:
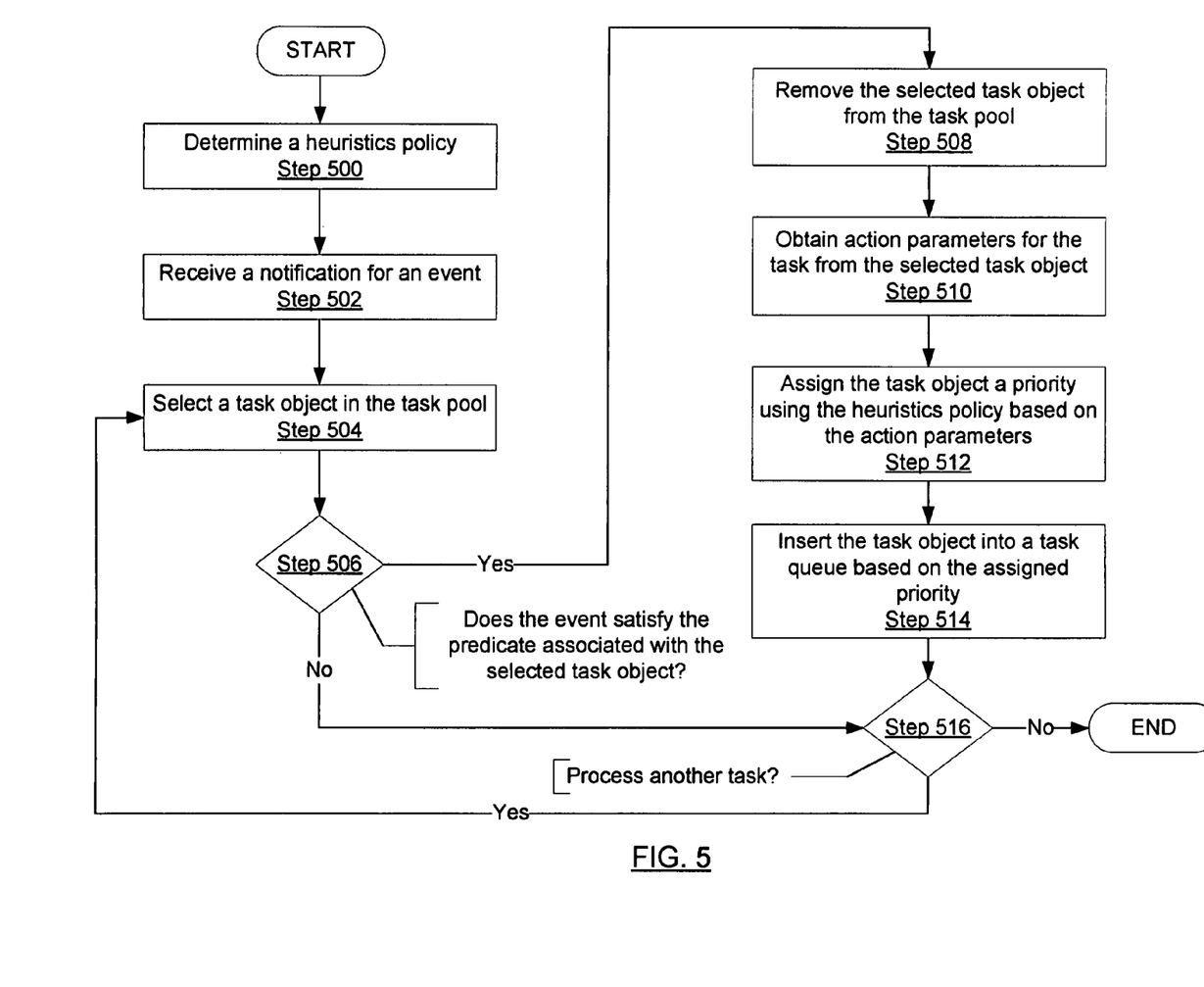

FIGS. 3, 4, and 5 show flowcharts in accordance with one or more embodiments of the invention. While the various steps in these flowcharts are presented and described sequentially, one should appreciate that some or all of the steps may be executed in different orders, may be combined or omitted, and some or all of the steps may be executed in parallel. In addition, steps have been omitted to simplify the presentation.

Turning to FIG. 3, the process shown therein may be used, for example, to process a request received by a task engine. In Step 300, a request is received. In one or more embodiments of the invention, the task engine assigns a unique transaction identifier to the request (i.e., not shown in FIG. 3).

In Step 302, a set of tasks corresponding with the request is determined using a request-to-task mapping. In one or more embodiments of the invention, the task engine uses the received request to select the appropriate request-to-task mapping. In one or more embodiments of the invention, this mapping is defined in accordance with the first data structure shown in FIG. 2b. Having selected the appropriate mapping, the task engine may then determine which tasks properly correspond with the request that was received. In one or more embodiments of the invention, Steps 304-308 (i.e., described below) may function as an iterative loop to process each one of the tasks in the set of tasks.

In Step 304, a task is selected from the set of tasks. In Step 306, the selected task is then used to obtain a corresponding task entry from the task store. In one or more embodiments of the invention, the task entry is defined as shown in FIG. 2a. Accordingly, obtaining a task entry allows the task engine to determine an action associated with the task and a predicate for performing the action.

In Step 308, the obtained task entry is used to create a task object, which is subsequently stored in a task pool. In one or more embodiments of the invention, the task object is associated with the same action and predicate as defined by the obtained task entry. Further, in one or more embodiments of the invention, the task object is further associated with an transaction identifier unique to the request (if assigned by the task engine in or after Step 300).

In Step 310, a determination is made as to whether another task from the set of tasks (i.e., from Step 302) requires processing (i.e., Steps 304-308). If another task from the set of tasks requires processing, then Step 304 is executed next with regards to a newly-selected task. Otherwise, if all tasks from the set of tasks have been processed, the process shown in FIG. 3 is completed for the received request.

Turning to FIG. 4, the process shown therein may be used, for example, to process an event notification received by a task engine. In Step 400, an event notification is received. In one or more embodiments of the invention, the task engine assigns a unique transaction identifier to the event notification (i.e., step not shown in FIG. 4).

In Step 402, a set of tasks corresponding with the event notification is determined using an event-to-task mapping. In one or more embodiments of the invention, the task engine uses the event from the event notification to select the appropriate event-to-task mapping. In one or more embodiments of the invention, this mapping is defined in accordance with the second data structure shown in FIG. 2b. Having selected the appropriate mapping, the task engine may then determine which tasks properly correspond with the received event notification. In one or more embodiments of the invention, Steps 404-408 (i.e., described below) may function as an iterative loop to process each one of the tasks in the set of tasks.

In Step 404, a task is selected from the set of tasks. In Step 406, the selected task is then used to obtain a corresponding task entry from the task store. In one or more embodiments of the invention, the task entry is defined as shown in FIG. 2a. Accordingly, obtaining a task entry allows the task engine to determine an action associated with the task and a predicate for performing the action.

In Step 408, the obtained task entry is used to create and store a task object in a task pool. In one or more embodiments of the invention, the task object is associated with the same action and predicate as defined by the obtained task entry. Further, in one or more embodiments of the invention, the task object is further associated with a transaction identifier unique to the event (if assigned by the task engine in or after Step 400).

In Step 410, a determination is made as to whether another task from the set of tasks (i.e., from Step 402) requires processing (i.e., Steps 404-408). If another task from the set of tasks requires processing, then Step 404 is executed next with regards to a newly-selected task. Otherwise, if all tasks from the set of tasks have been processed, the process shown in FIG. 4 is completed for the received event.

Turning to FIG. 5, the process shown therein may be used, for example, to process a pending task in a task pool using a heuristics policy when the predicate for an action associated with the pending task has been satisfied.

In Step 500, a heuristics policy is determined. In one or more embodiments of the invention, the heuristics policy may be determined based on a user selection from the heuristics policy store. For example, this selection by the user may be accomplished when the users issues a request using an API (i.e., the Task Management API). Alternatively, in one or more other embodiments of the invention, a heuristics policy may be determined based on another parameter such as time of day. In another embodiment of the invention, the heuristics policy may be determined based on an operational setting (e.g., the system is configured for real-time) and/or hardware configuration of the system (e.g., number of processors, amount of memory, etc.). Those skilled in the art will appreciate that any number (or combination) of factors may be used to determine the heuristics policy. In addition, the task engine may concurrent use of multiple heuristics policies at any given time.

Turning to FIG. 5, in Step 502, an event notification is received. In one or more embodiments of the invention, the task engine assigns a unique transaction identifier to the event notification (i.e., step not shown in FIG. 5). In one or more embodiments of the invention, Steps 504-516 (i.e., described below) may function as an iterative loop to process each one of the task objects in the task pool. In Step 504, a task object is selected from the task pool. In one or more embodiments of the invention, the task object is associated with an action and a predicate for performing the action. In Step 506, a determination is made as to whether the predicate for the action associated with the selected task object is satisfied by the event (i.e., from the event notification received in Step 502). If the predicate for the action is satisfied by the event, then Step 508 is executed next. Otherwise, if the predicate for the action is not satisfied by the event, Step 516 is executed next.

In one or more embodiments of the invention, the determination of Step 506 is contextual in that operational context of the event (i.e., received in Step 502) and the operational context of the selected task object (i.e., selected in Step 504) must match for the task object predicate to be satisfied. More specifically, transaction identifiers, as stored in each task object and as assigned by the task engine for each received request or event notification, are used to determine whether there is a match. In one embodiment of the invention, the use of transaction identifiers enables multiple task objects derived from the same task entry to contemporaneously exist in the storage pool and allow the appropriate events to satisfy the appropriate predicates.

In Step 508, the selected task object is removed from the task pool. In Step 510, an action parameter for the task is obtained from the selected task object. In Step 512, the task object is assigned a priority based on the action parameter (obtained in Step 510) using the heuristics policy.

In Step 514, the task object is inserted into a task queue based on the assigned priority. In one or more embodiments of the invention, the task object entries in the task queue are ordered with respect to priority. For example, a task queue may be ordered such that the first task object entry is assigned the highest priority relative to the other task objects in the task queue. As such, the task object entry that is positioned last in the task queue is assigned the lowest priority relative to the other task objects in the task queue.

In Step 516, a determination is made as to whether another task object from the task pool requires processing (i.e., Steps 504-516). If another task object from the task pool requires processing, then Step 504 is executed next with regards to a newly-selected task object. Otherwise, if all the task objects in the task pool have been processed, the process shown in FIG. 5 is complete. The task objects are subsequently processed, in priority order, from the task queue using execution threads dispatched from the dispatcher.

Those skilled in the art will appreciate that while FIG. 5 describes an embodiment in which the task scheduler assigns each task a priority based on the action parameter and heuristics policy, that the invention may be applied to scenarios in which the task scheduler does not use priority as the sole indicator of when a task object is scheduled for execution. For example, a task object may be associated with a given priority but also be designated as deferrable. In such cases, depending on the heuristics policy and the other task objects in the task queue, the task object may be deferred from executing even though the priority of the task object is higher than other task objects currently in the task queue.

In one embodiment of the invention, the predicates for the task objects are analyzed prior to the task objects being stored in the task pool or at some initial point after the task objects are in the task pool. During the aforementioned analysis, if the predicates are satisfied, e.g., because the predicate indicates that the task is to be automatically transferred to the task queue, then the task object is sent to task queue. In such cases, the task object may be forwarded to the task queue even though an event notification was not received.

Example

The following scenario presents an example in accordance with one or more embodiments of the invention. The example is not intended to limit the scope of the invention. For purposes of the example, assume a user is sitting in a wireless Internet café with a laptop computer that is equipped with a wireless network card. Further assume that the user wishes to spend some time browsing web pages on the Internet. As such, the user's laptop computer must first connect to the Internet. To this end, the user runs a user-level software application on the laptop computer which allows the user to issue a request for connecting to the Internet (or more specifically, a wireless network in the Internet café). Accordingly, the aforementioned software application receives a first request for connecting to the Internet from the user. In processing the first request from the user, the software application invokes a specific function in the Task Request API for connecting to the Internet.

As a result of the user-level software application invoking the Task Request API function, the task engine in the OS of the laptop computer receives a request. Accordingly, the task engine assigns a unique transaction identifier for the request. Further, the task engine determines a set of tasks using a request-to-task mapping maintained by the OS. In particular, the request-to-task mapping corresponds with the request for connecting to the Internet received by the task engine and, as such, specifies a set of mapped-to tasks that are necessary for Internet connectivity.

For example, a first task may be the detection of a wireless network card. As such, the first task may be said to depend upon, for example, the selection and loading of the OS. In addition, a second task may be the enabling of the radio on the wireless network card and, as such, may be said to depend upon the detection of a wireless network card (i.e., completion of the first task). Further, a third task may be the detection of one or more wireless networks. Accordingly, the third task may be said to depend upon the enabling of the radio on the wireless network card (i.e., completion of the second task). A fourth task may be the selection of and connection to a wireless network, which would depend upon the detection of a wireless network (i.e., completion of the third task).

In view of this, a request by a user may be mapped to a number of discrete tasks in accordance with one or more embodiments of the invention. Further, there may be an implied dependency among the mapped-to tasks as described above. A symbolic description of actions for the aforementioned tasks and their corresponding necessary predicates is provided below.

"Connect to Internet" Tasks

Task #1: if (OS is initialized) → action: detect a wireless network card
Task #2: if (completion of Task #1) → action: enable a radio for the wireless network card -continued "Connect to Internet" Tasks Task #3: if (completion of Task#2) → action: detect a wireless network
Task #4: if (completion of Task #3) → action: connect to wireless network Returning to the example, a task object is created in the task pool in correspondence to each of the mapped-to tasks determined by the task engine. Specifically, each task object is be associated with an action to be performed, a predicate for performing the action, and the transaction identifier. Accordingly, with the receipt of an event notification, the task engine iterates through each of the task objects in the task pool to determine whether a task predicate for a task object has been satisfied by the event. When a predicate is found to be satisfied, the task object with which the predicate is associated is then sent to a task scheduler. In this particular example, the operating system for the laptop computer has already been initialized. As such, because the predicate for the first task is already satisfied, the first task object is sent to the task scheduler.

The task scheduler uses the task object to obtain an action parameter. Further, a heuristics policy is used to determine a priority for the task object based on the action parameter. Accordingly, the task object is then inserted into a position in the task queue based on the task's assigned priority. Once tasks are placed in the task queue, a dispatcher in the operating system obtains the highest-priority task object and subsequently dispatch an execution thread to perform the action associated with the task object.

For purposes of this example, let us assume that connecting to the internet correlates to a set of tasks with a moderate priority level. As such, the aforementioned first through fourth tasks are placed in the queue accordingly. In extending our example, let us assume that the laptop computer user is simultaneously engaging in a computing activity that qualifies for a higher priority level (i.e., playing a video from a media file stored on disk). As such, tasks related to this other activity are be positioned closer to the front of the task queue. Accordingly, the dispatcher execute actions in task objects associated with the higher priority tasks before the action in the task object for wireless network card detection is performed (i.e., the first task).

Later, when the dispatcher does perform the action of wireless network card detection, an event notification may be received by the task engine memorializing that specific event. The event notification may also include the transaction identifier associated with the executed task. Once created, the event notification is sent to the task engine for purposes of providing a notification that a wireless network card has been detected. The task engine, having then received the event notification, will again search the task objects in the task pool to determine whether any of the action predicates embodied in the task objects are now satisfied in light of the received event (i.e., detection of a wireless network card). In the context of this particular example, the task engine will determine that the detection of a wireless network card satisfies the predicate for enabling the radio on the wireless network card.

The example above is but a specific example of how task objects in a task pool may be processed in light of an event notification (i.e., the completion of an action in the example but, more generally, any event suffices) to result in the performance of an action. Further, the performance of that particular action may itself satisfy the predicate for a next action as described above.

In addition, the assignment of a transaction identifier may be used by the task engine to provide not only an operational context within the system for tasks and events. For instance, in the example above, a unique transaction identifier was issued when the task engine received the 'connect to the internet' request from the user-level software application. Accordingly, all mapped-to tasks determined by the task engine to be associated with the request are instantiated as task objects with the like transaction identifier. Further, when a task object is executed, an event notification is created using the same transaction identifier for sending to the task engine. As such, the task engine, when it receives the event notification, is able to use the transaction identifier to determine whether a task object in the task pool belongs to the same operational context within the system as the just-completed event of the event notification.

Embodiments of the invention may allow for more efficient use of resources in a system. Specifically, embodiments of the invention allows developers and users of a system to more precisely relate a task or set of tasks to an action, operation, or circumstance elsewhere in the system (i.e., predicates). Embodiments of the invention allow for tasks to be related to events such that a task may be, for example, performed or performed more/less frequently based on the occurrence of a specified event. Accordingly, costs associated with polling are reduced because polling may be executed at a bare minimum until a specified predicate is satisfied. Alternatively, a predicate for a task may be specified as a function of elapsed time rather than the occurrence of a discrete event. Accordingly, in enabling the expression of task predicates as described, features of the invention allow for greater flexibility and latitude with regards to the scheduling of tasks. For example, tasks may be scheduled in accordance with any number of pre-defined or user-defined heuristics policies as discussed.

Figure 6:
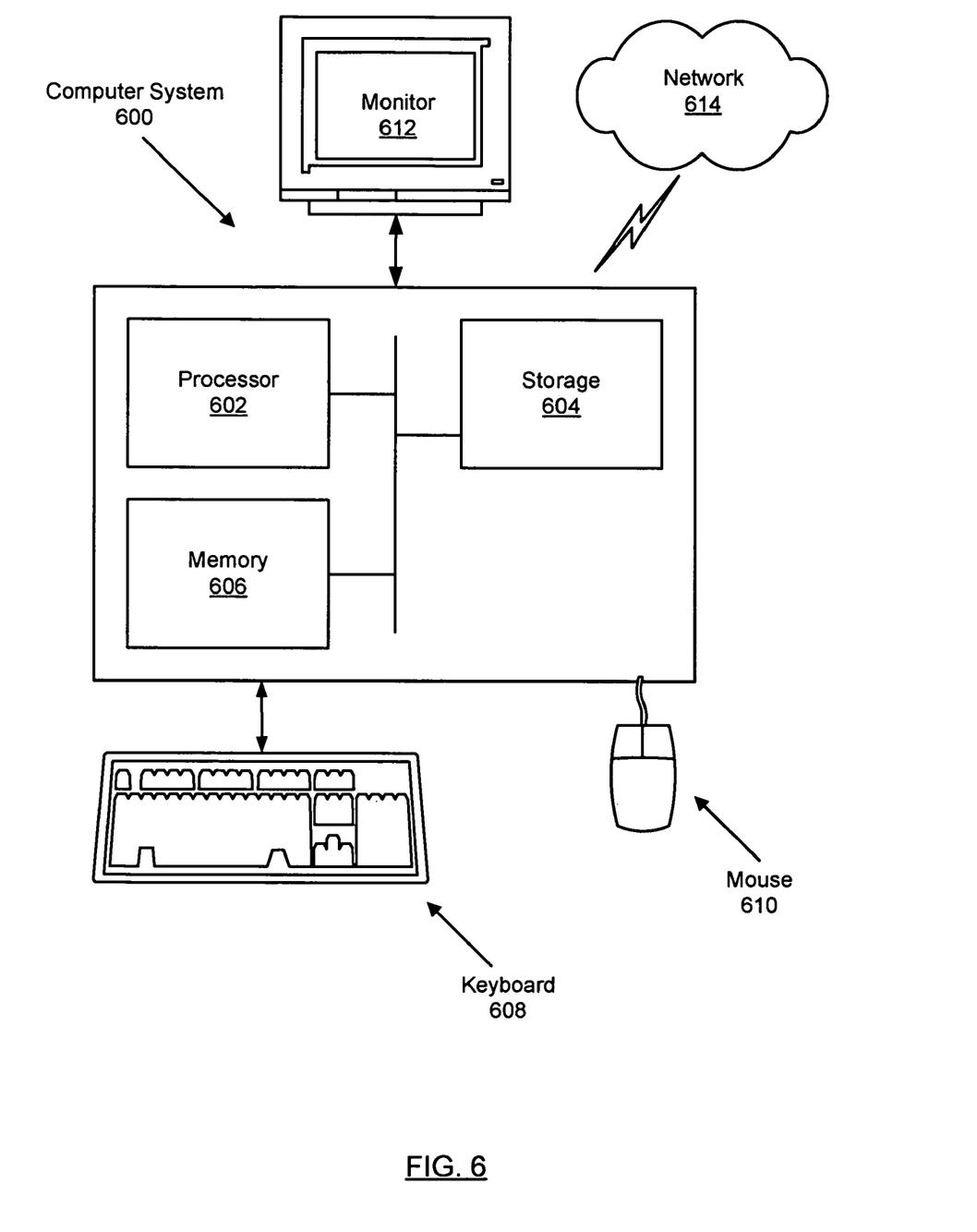
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more processors (602), associated memory (606) (e.g., random access memory (RAM), cache memory, flash memory, etc.), a storage device (604) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising executable instructions for heuristics-based task scheduling, wherein the executable instructions comprise instructions to:
   receive a request at a task engine;
   determine a first task corresponding to the request using a request-to-task mapping;
   obtain a first task entry corresponding with the first task from a task store, wherein the first task entry associates the first task with a first action, a first predicate for performing the first action, and a first action parameter for the first action;
   create a first task object in a task pool;
   receive a first event notification at the task engine, wherein the first event notification is associated with a first event;
   determine the first event using the first event notification;
   determine whether the first predicate for the first action is satisfied by the first event, wherein the first predicate for the first action, the first action, the first action parameter for the first action are associated with the first task object in the task pool;
   obtain the first action parameter using the first task object when the first predicate for the first action is satisfied by the first event;
   assign the first task object a priority using a heuristics policy based on the first action parameter; and
   insert the first task object into a task queue using the assigned priority, wherein the task queue comprises a plurality of task objects, and wherein the plurality of task objects are ordered according to priority,
   wherein the first action associated with the first task object is performed by an execution thread when the first task object is obtained from the task queue, wherein the performance of the first action is a second event, and wherein the second event is associated with a second event notification sent to the task engine.

2. The non-transitory computer readable medium of claim 1, wherein the request is one selected from a group consisting of a request generated by a user-level application, a request generated by an operating system, and a request generated by a hardware resource.

3. The non-transitory computer readable medium of claim 2, wherein the request generated by the user-level application is sent using a Task Request Application Programming Interface (API).

4. The non-transitory computer readable medium of claim 1, wherein the executable instructions further comprise instructions to:
   receive a third event notification at the task engine, wherein the third event notification is associated with a third event;
   determine a second task corresponding to the third event using an event-to-task mapping;

obtain a second task entry corresponding with the second task from the task store, wherein the second task entry associates the second task with a second action and a second predicate for performing the second action; and
create a second task object in the task pool.

5. The non-transitory computer readable medium of claim 1, wherein the executable instructions further comprise instructions to:
remove the first task object from the task pool when the first predicate for the first action is satisfied by the first event.

6. The non-transitory computer readable medium of claim 1, wherein the heuristics policy used to assign the priority to the first task object is one of a plurality of heuristics policies stored in a heuristics policy store.

7. The non-transitory computer readable medium of claim 6, wherein a determination of the heuristics policy from the plurality of heuristics policies is made using one selected from a group consisting of a user selection, an operational setting of a system upon which the first action is performed, and a hardware configuration of the system upon which the first action is performed.

8. The non-transitory computer readable medium of claim 4, wherein the request-to-task mapping, the event-to-task mapping, and the first task entry are created when a user makes the request using a Task Management API.

9. A system for heuristics-based task scheduling, comprising:
a processor;
an operating system executing on the processor, wherein the operating system comprises:
a task engine, configured to:
receive a request;
determine a first task corresponding with the request using a request-to-task mapping;
obtain a first task entry corresponding with the first task from a task store, wherein the first task entry associates the first task with a first action, a first predicate for performing the first action, and a first action parameter for the first action;
create a first task object in a task pool using the first task entry, wherein the first task object is associated with the first action, the first predicate, and the first action parameter;
receive a first event notification, wherein the first event notification is associated with a first event;
determine the first event using the first event notification;
determine whether the first predicate for performing the first action is satisfied by the first event; and
send the first task object to a task scheduler when the first predicate for performing the first action is satisfied by the first event;
the task store, configured to:
store the first task entry;
the task pool, configured to:
store the first task object when the first predicate for the first action has not yet been satisfied;
a heuristics policy store, configured to:
store a heuristics policy for assigning a first priority to a task object;
the task scheduler, configured to:
obtain the first action parameter using the first task object when the first predicate for the first action is satisfied by the first event;
assign the first task object the first priority using the heuristics policy based on the first action parameter; and
insert the first task object into a task queue using the first priority, wherein the task queue comprises a plurality of task objects, and wherein the plurality of task objects are ordered according to priority;
the task queue, configured to:
store the first task object when the first predicate for the first action has been satisfied and the first task object has been assigned the first priority by the task scheduler;
a dispatcher, configured to:
obtain the first task object from the task queue;
determine the first action using the first task object;
determine a first execution thread for performing the first action; and
dispatch the first execution thread for performing the first action,
wherein the operating system is configured to create a second event notification for sending to the task engine when the first execution thread has completed performing the first action, and wherein the completion of the first action is a second event associated with the second event notification.

10. The system of claim 9, wherein
the task engine is further configured to:
receive a third event notification, wherein the third event notification is associated with a third event;
determine a second task corresponding with the third event using an event-to-task mapping;
obtain a second task entry corresponding with the second task from the task store, wherein the second task entry associates the second task with a second action, a second predicate for performing the second action, and a second action parameter;
create a second task object in the task pool using the second task entry, wherein the second task object is associated with the second action, the second predicate, and the second action parameter;
receive a fourth event notification, wherein the fourth event notification is associated with a fourth event;
determine the fourth event using the fourth event notification;
determine whether the second predicate for performing the second action is satisfied by the fourth event; and
send the second task object to the task scheduler when the second predicate for performing the second action is satisfied by the fourth event;
the task store is further configured to:
store the second task entry;
the task pool is further configured to:
store the second task object when the second predicate for the second action has not yet been satisfied;
the task scheduler, further configured to:
obtain the second action parameter using the second task object when the second predicate for the second action is satisfied by the second event;
assign the second task object the second priority using the heuristics policy based on the second action parameter; and
insert the second task object into the task queue using the second priority;
the task queue is further configured to:
store the second task object when the second predicate for the second action has been satisfied and the second task object has been assigned a second priority by the task scheduler; and the dispatcher, further configured to:
obtain the second task object from the task queue;
determine the second action using the second task object;
determine a second execution thread for performing the second action; and
dispatch the second execution thread for performing the second action,
wherein the operating system is configured to create a fifth event notification for sending to the task engine when the second execution thread has completed performing the second action, and wherein the completion of the second action is a fifth event associated with the fifth event notification.

11. The system of claim 9, wherein the first request is one selected from a group consisting of a request generated by a user-level application, a request generated by the operating system, and a request generated by a hardware resource.

12. The system of claim 11, wherein the request generated by the user-level application is sent using a Task Request API.

13. The system of claim 10, wherein the task engine is further configured to:
remove the first task object from the task pool when the first predicate for the first action is satisfied by the first event; and
remove the second task object from the task pool when the second predicate for the second action is satisfied by the fourth event.

14. The system of claim 9, wherein the heuristics policy is one of a plurality of heuristics policies stored in the heuristics policy store.

15. The system of claim 14, wherein a determination of the heuristics policy from the plurality of heuristics policies is made using one selected from a group consisting of a user selection, an operational setting of a system upon which the first action is performed, and a hardware configuration of the system upon which the first action is performed.

16. The system of claim 10, wherein the request-to-task mapping, the event-to-task mapping, the first task entry, and the second task entry are created when a user makes the request using a Task Management API.

* * * * *